United States Patent
Walsh

(10) Patent No.: US 7,688,736 B1
(45) Date of Patent: Mar. 30, 2010

(54) NETWORK SWITCH WITH QUALITY OF SERVICE FLOW CONTROL

(75) Inventor: Hugh Walsh, Los Gatos, CA (US)

(73) Assignee: Marvell International Ltd, Hamilton (BM)

( * ) Notice: Subject to any disclaimer, the term of this patent is extended or adjusted under 35 U.S.C. 154(b) by 1367 days.

(21) Appl. No.: 10/669,783

(22) Filed: Sep. 23, 2003

Related U.S. Application Data

(60) Provisional application No. 60/467,873, filed on May 5, 2003.

(51) Int. Cl.
*G01R 31/08* (2006.01)
*H04L 12/28* (2006.01)
*H04J 3/16* (2006.01)
*G06F 15/167* (2006.01)
*G06F 15/16* (2006.01)

(52) U.S. Cl. .............. 370/236; 370/412; 370/465; 709/215; 709/232

(58) Field of Classification Search ...... 370/229–230.1, 370/235–236.2, 413, 414, 465; 709/207, 709/215; 711/147
See application file for complete search history.

(56) References Cited

U.S. PATENT DOCUMENTS

| | | | |
|---|---|---|---|
| 6,115,356 A | 9/2000 | Kalkunte et al. | |
| 6,167,054 A * | 12/2000 | Simmons et al. | 370/422 |
| 6,192,028 B1 | 2/2001 | Simmons et al. | |
| 6,192,422 B1 | 2/2001 | Daines et al. | |
| 6,246,690 B1 | 6/2001 | DiPlacido et al. | |
| 6,252,849 B1 | 6/2001 | Rom et al. | |
| 6,405,258 B1 | 6/2002 | Erimli et al. | |
| 6,456,590 B1 | 9/2002 | Ren et al. | |
| 6,501,732 B1 | 12/2002 | Xu et al. | |
| 6,570,850 B1 | 5/2003 | Gutierrez et al. | |
| 6,714,517 B1 * | 3/2004 | Fawaz et al. | 370/236 |
| 6,907,453 B2 * | 6/2005 | Shankar et al. | 709/207 |

(Continued)

FOREIGN PATENT DOCUMENTS

WO    WO 03/017702 A1    2/2003

OTHER PUBLICATIONS

U.S. Appl. No. 10/071,417, Pannell et al.
U.S. Appl. No. 10/150,147, Walsh et al.
U.S. Appl. No. 10/141,096, Walsh et al.
Seifert, "The Switch Book: The Complete Guide to LAN Switching Technology," 2000, pp. 640-641, John Wiley & Sons, US.
Noureddine et al., "Selective Back-Pressure in Switched Ethernet LANS," Proceedings of IEEE Globecom, Dec. 1999, pp. 1-9, IEEE, US.
Jain, "Myths About Congestion Management in High-Speed Networks," Internetworking: Research and Experience, 1992, pp. 101-113, vol. 29, Issue 2, US.

*Primary Examiner*—Nittaya Juntima

(57) ABSTRACT

A network switching device, and corresponding method and computer program, comprising an ingress module adapted to receive frames of data from a channel, wherein each frame of data has one of a plurality of classes of service, and to store the data in one or more buffers; and an egress module adapted to exercise flow control on the channel for each of the classes of service when the number of the buffers storing frames of data received from the channel and having the class of service but not yet transmitted from the network switching device exceeds a predetermined threshold for the class of service.

44 Claims, 8 Drawing Sheets

U.S. PATENT DOCUMENTS

| | | | |
|---|---|---|---|
| 7,027,457 B1* | 4/2006 | Chiussi et al. | 370/414 |
| 7,286,547 B2* | 10/2007 | Tzeng et al. | 370/412 |
| 7,561,590 B1* | 7/2009 | Walsh | 370/416 |
| 2002/0191542 A1 | 12/2002 | Pauwels et al. | |
| 2003/0123393 A1* | 7/2003 | Feuerstraeter et al. | 370/235 |
| 2004/0004971 A1* | 1/2004 | Wang | 370/412 |
| 2004/0081090 A1* | 4/2004 | Hara et al. | 370/229 |
| 2004/0179476 A1* | 9/2004 | Kim et al. | 370/230 |

* cited by examiner

NETWORK SWITCH WITH QUALITY OF SERVICE FLOW CONTROL

CROSS-REFERENCE TO RELATED APPLICATIONS

This application claims the benefit of U.S. Provisional Patent Application Ser. No. 60/467,873 entitled "Virtual Input Queues," filed May 5, 2003, the disclosure thereof incorporated by reference herein in its entirety.

This application is related to U.S. Non-provisional patent application Ser. No. 10/071,417 entitled "Quality of Service Queuing System," filed Feb. 6, 2002, now U.S. Pat. No. 7,035,273 issued on Apr. 25, 2006, U.S. Non-provisional patent application Ser. No. 10/150,147 entitled "Apparatus and Method for Dynamically Limiting Output Queue Size in a Quality of Service Switch," filed May 17, 2002, now U.S. Pat. No. 7,110,415 issued on Sep. 19, 2006, and U.S. Non-provisional patent application Ser. No. 10/141,096 entitled "Method and Apparatus for Preventing Blocking in a Quality of Service Switch," filed May 7, 2002, now U.S. Pat. No. 7,209,440 issued on Apr. 24, 2007, the disclosures thereof incorporated by reference herein in their entirety.

BACKGROUND

The present invention relates generally to data communications, and particularly to network switches implementing flow control for data having multiple classes of service.

The rapidly increasing popularity of networks such as the Internet has spurred the development of network services such as streaming audio and streaming video. These new services have different latency requirements than conventional network services such as electronic mail and file transfer. New quality of service (QoS) standards require that network devices, such as network switches, address these latency requirements. For example, the IEEE 802.1 standard divides network traffic into several classes of service based on sensitivity to transfer latency, and prioritizes these classes of service. The highest class of service is recommended for network control traffic, such as switch-to-switch configuration messages. The remaining classes are recommended for user traffic. The two highest user traffic classes of service are generally reserved for streaming audio and streaming video. Because the ear is more sensitive to missing data than the eye, the highest of the user traffic classes of service is used for streaming audio. The remaining lower classes of service are used for traffic that is less sensitive to transfer latency, such as electronic mail and file transfers.

Another desirable switch feature, referred to as "flow control," prevents the switch from discarding or "dropping" frames. One flow control technique is defined by the IEEE 802.3 standard. When a switch implementing the standard becomes congested, it can exercise flow control by sending a "pause" frame to one or more link partners. In response, the link partners stop sending frames to the switch until the switch sends a "pause release" frame, or until an interval specified by the "pause" frame elapses. Thus flow control allows a switch to regulate the flow of inbound data.

However, the IEEE 802.3 flow control standard has no provision for quality of service. Therefore, when flow control is exercised on a channel under IEEE 802.3, it applies to all classes of service. High-priority traffic is delayed as long as low-priority traffic. Thus when flow control under IEEE 802.3 is imposed, quality of service cannot be achieved.

SUMMARY

In general, in one aspect, the invention features a network switching device comprising an ingress module adapted to receive frames of data from a channel, wherein each frame of data has one of a plurality of classes of service, and to store the data in one or more buffers; and an egress module adapted to exercise flow control on the channel for each of the classes of service when the number of the buffers storing frames of data received from the channel and having the class of service but not yet transmitted from the network switching device exceeds a predetermined threshold for the class of service.

Particular implementations can include one or more of the following features. To exercise flow control for one of the classes of service, the egress module is further adapted to send a pause frame to the channel, and wherein the pause frame indicates the one of the classes of service. The egress module is further adapted to terminate flow control on the channel for each of the classes of service when the number of the buffers storing frames of data having the class of service but not yet transmitted from the network switching device falls below a further predetermined threshold for the class of service. To terminate flow control for one of the classes of service, the egress module is further adapted to send a pause release frame to the channel, and wherein the pause release frame indicates the one of the classes of service. Implementations comprise one or more queues; a forwarding module adapted to enqueue each of the buffers to one or more of the one or more queues after the ingress module stores the data of one of the frames in the buffer; a plurality of counters comprising one counter for each of the classes of service, wherein each of the counters is adapted to store a count for the channel for a respective one of the classes of service, increment the count when the forwarding module enqueues one of the buffers storing the data from one of the frames having the respective class of service, and decrement the count after the data stored in a buffer for a frame received from the channel and having the respective class of service is transmitted from the network switching device; wherein the egress module is adapted to exercise flow control on the channel for each of the classes of service when the count for the class of service exceeds the predetermined threshold for the class of service. The egress module is further adapted to terminate flow control on the channel for each of the classes of service when the count for the class of service falls below a further predetermined threshold for the class of service. Implementations comprise an integrated circuit comprising the network switching device. Implementations comprise a network switch comprising the network switching device. Implementations comprise an output-queued network switch comprising the network switching device. Implementations comprise a memory comprising the buffers. Implementations comprise a reserve module adapted to reserve one or more of the buffers to the channel; wherein the pause threshold for the channel is a function of at least one of the group consisting of the number of the buffers reserved to the channel; and the number of the buffers neither reserved nor enqueued. Implementations comprise a reserve module adapted to reserve one or more of the buffers to the channel; wherein the pause release threshold for the channel is a function of at least one of the group consisting of the number of the buffers reserved to the channel; and the number of the buffers neither reserved nor enqueued.

In general, in one aspect, the invention features a method, apparatus, and computer-readable media. It comprises receiving frames of data from a channel, wherein each frame of data has one of a plurality of classes of service; storing the data in one or more buffers; and exercising flow control on the channel for each of the classes of service when the number of the buffers storing frames of data received from the channel and having the class of service but not yet transmitted from the network switch exceeds a predetermined threshold for the class of service.

Particular implementations can include one or more of the following features. Exercising flow control for one of the classes of service comprises sending a pause frame to the channel, wherein the pause frame indicates the one of the classes of service. Implementations comprise terminating flow control on the channel for each of the classes of service when the number of the buffers storing frames of data having the class of service but not yet transmitted from the network switch falls below a further predetermined threshold for the class of service. Terminating flow control for one of the classes of service comprises sending a pause release frame to the channel, and wherein the pause release frame indicates the one of the classes of service. Implementations comprise enqueueing each of the buffers to one or more output queues after storing the data of one of the frames in the buffer; storing a count for the channel for each of the classes of service; incrementing the count for one of the classes of service when enqueueing one of the buffers storing the data from one of the frames received from the channel and having the one of the classes of service, and decrementing the count for one of the classes of service after the data stored in a buffer for a frame received from the channel and having the one of the classes of service is transmitted; wherein exercising flow control on the channel for each of the classes of service comprises exercising flow control on the channel for one of the classes of service when the count for the one of the classes of service exceeds the predetermined threshold for the one of the classes of service. Implementations comprise terminating flow control on the channel for each of the classes of service when the count for the class of service falls below a further predetermined threshold for the class of service.

In general, in one aspect, the invention features a network switching device comprising a memory adapted to store frames of data; an egress module adapted to retrieve the frames of data from the a memory, and to transmit the frames of data to a channel, wherein each of the frames of data has one of a plurality of classes of service; and an ingress module adapted to receive a pause frame indicating one or more of the classes of service to be paused; wherein, in response to the pause frame, the egress module is further adapted to cease to transmit the frames of data having the one or more classes of service to be paused, and continue to transmit the frames of data not having the one or more classes of service to be paused.

Particular implementations can include one or more of the following features. The ingress module is further adapted to receive a pause release frame indicating one or more of the classes of service to be released; wherein, in response to the pause frame, the egress module is further adapted to resume transmitting the frames of data having the one or more classes of service to be released. Implementations comprise an integrated circuit comprising the network switching device. Implementations comprise a network switch comprising the network switching device. Implementations comprise an output-queued network switch comprising the network switch. Implementations comprise a memory comprising the buffers.

In general, in one aspect, the invention features a method, apparatus, and computer-readable media. It comprises transmitting frames of data to a channel, wherein each of the frames of data has one of a plurality of classes of service; receiving a pause frame indicating one or more of the classes of service to be paused; and in response to the pause frame, ceasing to transmit the frames of data having the one or more classes of service to be paused, and continuing to transmit the frames of data not having the one or more classes of service to be paused.

Particular implementations can include receiving a pause release frame indicating one or more of the classes of service to be released; and in response to the pause frame, resuming transmitting the frames of data having the one or more classes of service to be released.

The details of one or more implementations are set forth in the accompanying drawings and the description below. Other features will be apparent from the description and drawings, and from the claims.

Figure 1:
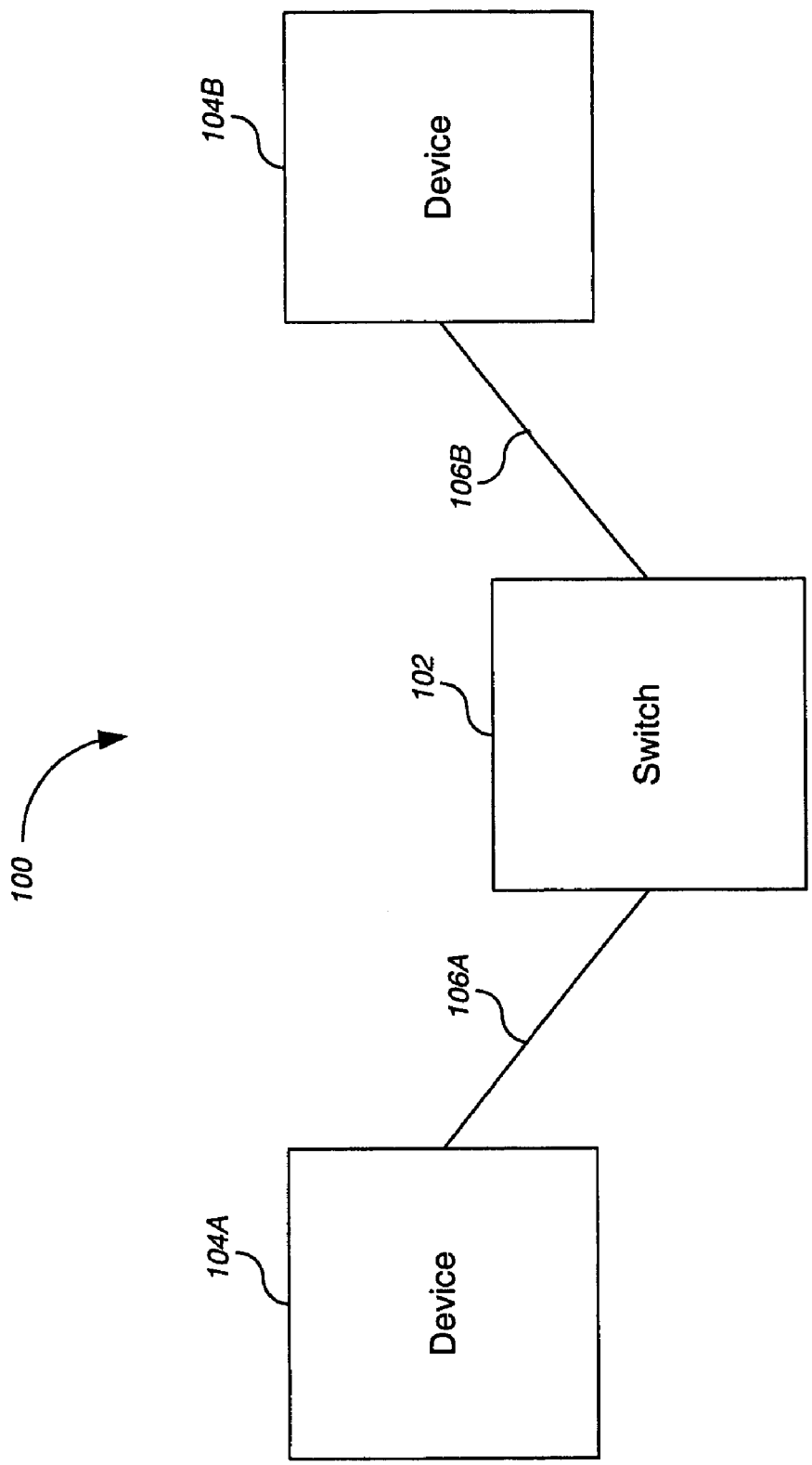
FIG. 1 shows a simple network in which a network switch connects two devices.

The leading digit(s) of each reference numeral used in this specification indicates the number of the drawing in which the reference numeral first appears.

DETAILED DESCRIPTION

FIG. 1 shows a simple network 100 in which a network switch 102 connects two devices 104A and 104B. Each of devices 104 can be any network device, such as a computer, a printer, another network switch, or the like. Switch 102 transfers data between devices 104 over channels 106A and 106B, and can also handle an arbitrary number of devices in addition to devices 104. Channels 106 can include fiber optic links, wireline links, wireless links, and the like.

Figure 2:
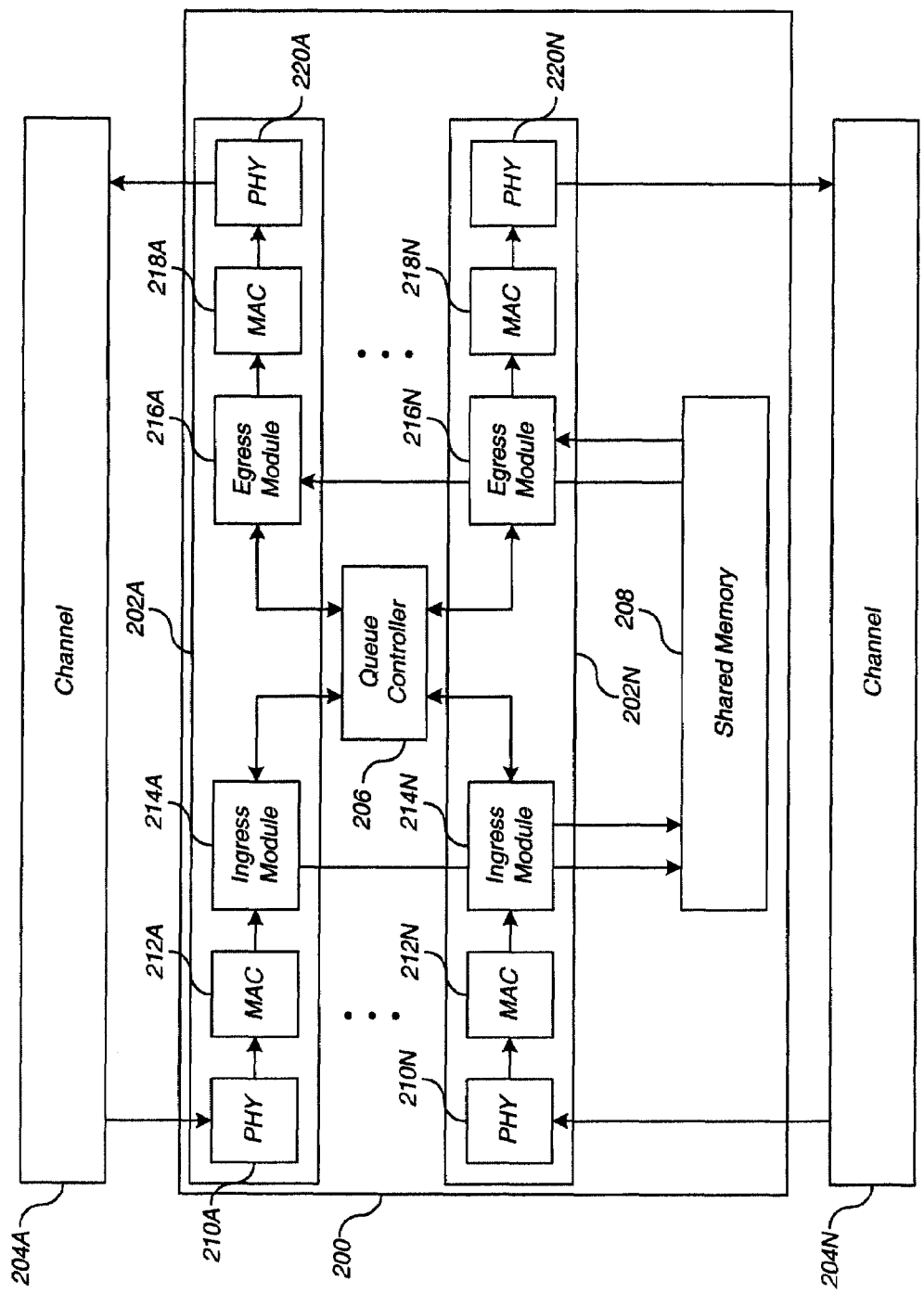
FIG. 2 is a block diagram of a conventional shared-memory output-queue store-and-forward network switch that can act as the switch in network of FIG. 1.

FIG. 2 is a block diagram of a conventional shared-memory output-queue store-and-forward network switch 200 that can act as switch 102 in network 100 of FIG. 1. Switch 200 has a plurality of ports including ports 202A and 202N. Each port 202 is connected to a channel 204, a queue controller 206 and a memory 208. Each port 202 includes an ingress module 214 that is connected to a channel 204 by a physical layer (PHY) 210 and a media access controller (MAC) 212. Referring to FIG. 2, port 202A includes an ingress module 214A that is connected to channel 204A by a MAC 212A and a PHY 210A, while port 202N includes an ingress module 214N that is connected to channel 204N by a MAC 212N and a PHY 210N. Each port 202 also includes an egress module 216 that is connected to a channel 204 by a MAC 218 and a PHY 220. Referring to FIG. 2, port 202A includes an egress module 216A that is connected to channel 204A by a MAC 218A and a PHY 220A, while port 202N includes an egress module 216N that is connected to channel 204N by a MAC 218N and a PHY 220N.

Figure 3:
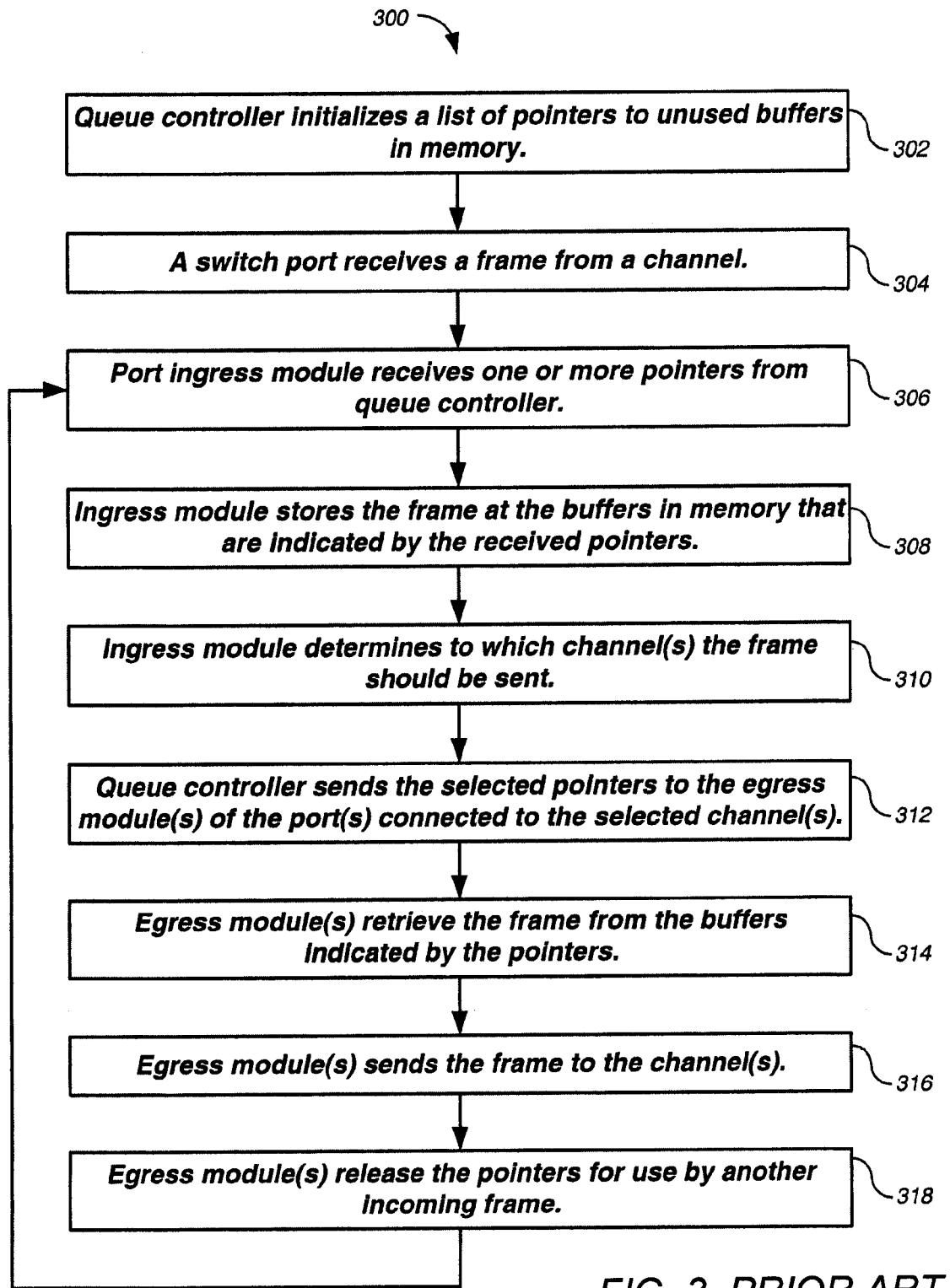
FIG. 3 is a flowchart of a conventional process performed by the network switch of FIG. 2.

FIG. 3 is a flowchart of a conventional process 300 performed by network switch 200. At power-on, queue controller 206 initializes a list of pointers to unused buffers in memory 208 (step 302). A port 202 of switch 200 receives a frame from a channel 204 (step 304). The frame enters the port 202 connected to the channel 204 and traverses the PHY 210 and MAC 212 of the port 202 to reach the ingress module 214 of the port 202. Ingress module 214 requests and receives one or more pointers from queue controller 206 (step 306). Ingress module 214 stores the frame at the buffers in memory 208 that are indicated by the received pointers (step 308).

Ingress module 214 then determines to which channel (or channels in the case of a multicast operation) the frame should be sent, according to methods well-known in the relevant arts (step 310). Queue controller 206 sends the selected pointers to the egress modules 216 of the ports connected to the selected channels (step 312). These egress modules 216 then retrieve the frame from the buffers indicated by the pointers (step 314) and send the frame to their respective channels 204 (step 316). These egress modules 216 then release the pointers for use by another incoming frame (step 318). The operation of switch 200 is termed "store-and-forward" because the frame is stored completely in the memory 208 before leaving the switch 200. The store-and-forward operation creates some latency. Because all of the switch ports 202 use the same memory 208, the architecture of switch 202 is termed "shared memory."

The queue controller 206 performs the switching operation by operating only on the pointers to memory 208. The queue controller 206 does not operate on the frames. If pointers to frames are sent to an egress module 216 faster than that egress module 216 can transmit the frames over its channel 204, the pointers are queued within that port's output queue 216. Because pointers accumulate only at the output side of switch 200, the architecture of switch 200 is also termed "output-queued." Thus switch 200 has a store-and-forward, shared-memory, output-queued architecture.

Figure 4:
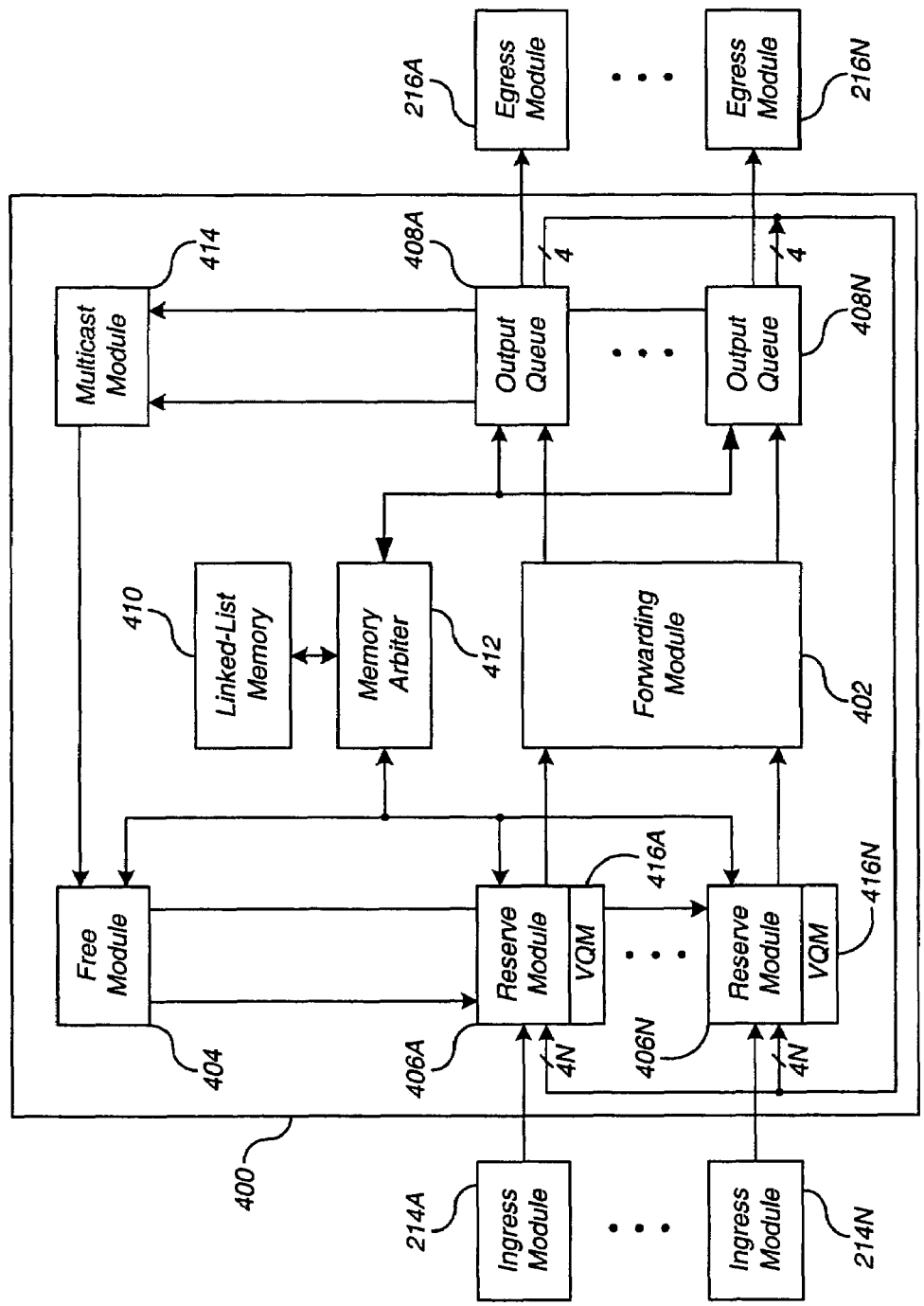
FIG. 4 is a block diagram of a queue controller suitable for use as the queue controller in the network switch of FIG. 2.

FIG. 4 is a block diagram of a queue controller 400 suitable for use as queue controller 206 in network switch 200 of FIG. 2. Queue controller 400 can be implemented using hardware, software, or any combination thereof. Queue controller 400 includes a forwarding module 402, a free module 404, a plurality of reserve modules 406A through 406N, a plurality of virtual queue modules (VQM) 416A through 416N, and a plurality of output queues 408A through 408N. Each reserve module 406 and virtual queue module 416 is connected to one of ingress modules 214. Each output queue 408 is connected to one of egress modules 216.

Each virtual queue module 416 comprises a plurality of counters, one for each class of service of the frames of data received by network switch 200. Each counter keeps a count of the number of buffers storing frames of data that (1) have the class of service of the counter, (2) were received on the channel 204 served by the counter and enqueued to one of output queues 408, and (3) have not yet been transmitted by switch 200. The counts kept by these counters are used to implement quality of service flow control, as described in detail below.

Free module 404 and reserve modules 406 each contain one linked list of pointers to buffers in shared memory 208. Each output queue 408 contains a priority queue for each class of service implemented by switch 400. Each priority queue contains one linked list of pointers to buffers in shared memory 208. In one implementation, switch 400 implements four classes of service labeled class 0 through class 3, with class 3 having the highest priority. In this implementation, each output queue 408 contains four priority queues. Other implementations can implement fewer or greater classes of service, as will be apparent to one skilled in the relevant art after reading this description.

All of the linked lists for free module 404, reserve modules 406, and output queues 408 are stored in a linked-list memory 410. A memory arbiter 412 arbitrates among competing requests to read and write linked-list memory 410. Each of free module 404, reserve modules 406, and output queues 408 maintains an object that describes its linked list. Each of these objects maintains the size of the list and pointers to the head and tail of the list. Each of free module 404, reserve modules 406, and output queues 408 traverses its linked list by reading and writing the "next" links into and out of linked list memory 410.

Figure 5:
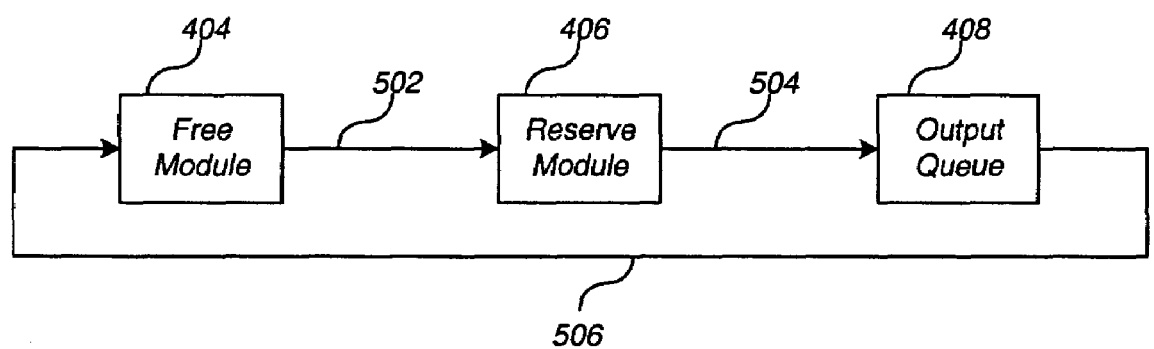
FIG. 5 depicts the manner in which these pointers circulate within the queue controller of FIG. 4.

Free module 404 contains pointers to buffers in memory 208 that are available to store newly-received frames (that is, the buffers have an available status). Each reserve module 406 contains a list of pointers to available buffers that are reserved for the port housing that reserve module. FIG. 5 depicts the manner in which these pointers circulate within queue controller 400. Queue controller 400 allocates pointers from free module 404 to reserve modules 406 according to the methods described below (flow 502). Buffets associated with pointers in a free module 404 have an available status until a frame is stored in the buffers. Storing a frame in one or more buffers changes the status of those buffers to unavailable. To forward a frame to an output port, the frame is stored in a buffer in memory 208, and the pointers to that buffer are transferred to the output queue 408 for that output port (flow 504). When a frame is sent from an output port to a channel 106, the pointers for that frame are returned to free module 404, thereby changing the status of the pointers to available (flow 506).

Multicast module 414 handles multicast operations. In linked-list memory 410, pointers associated with the start of a frame also have a vector including a bit for each destined output port for the frame. When an output port finishes transmitting a frame, the output queue passes the frame's pointers to multicast module 414, which clears the bit in the destination vector associated with that output port. When all of the bits in the destination vector have been cleared, the frame's pointers are returned to free module 404.

Figure 6:
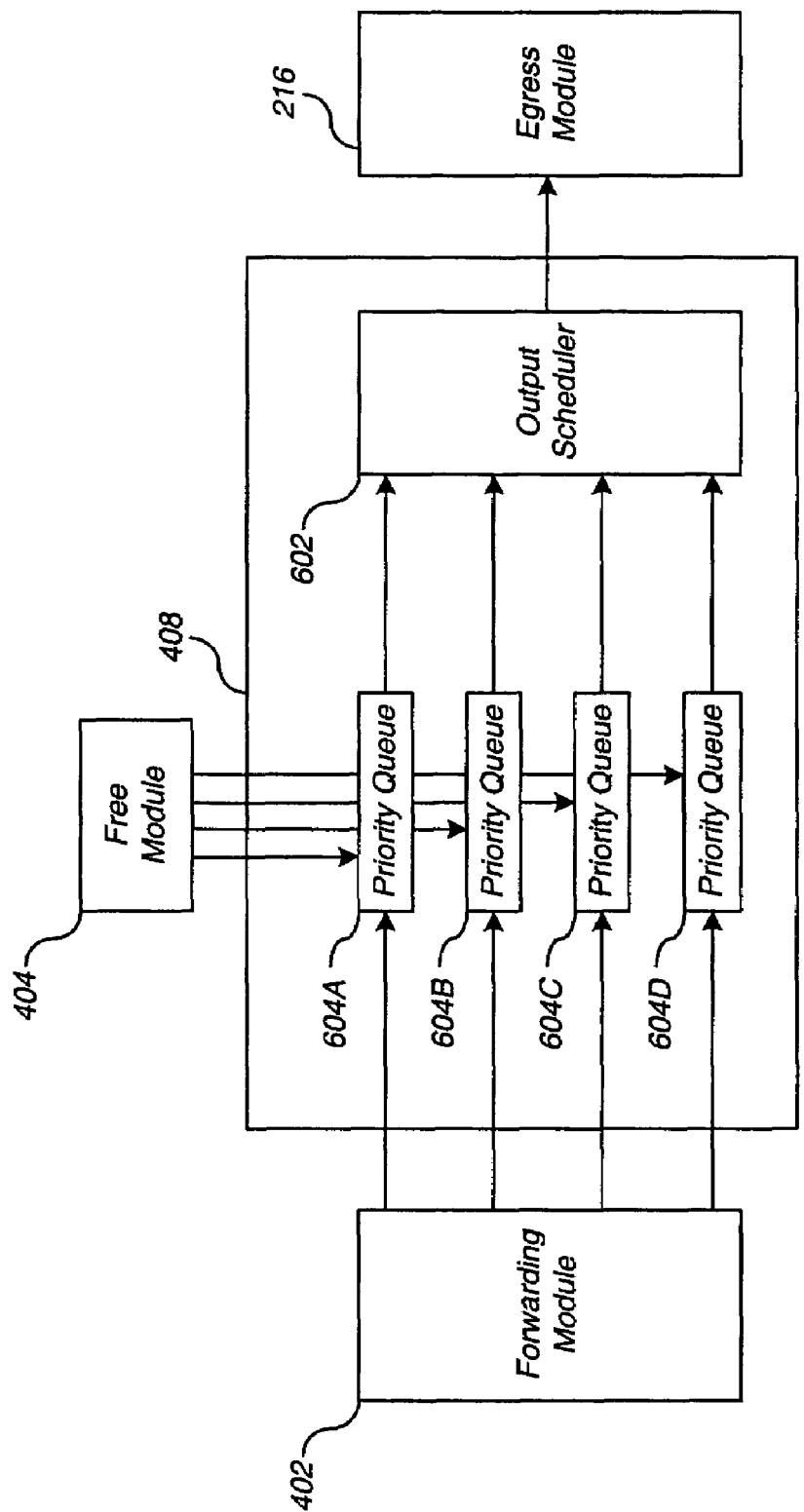
FIG. 6 is a block diagram of an output queue according to one implementation.

FIG. 6 is a block diagram of an output queue 408 according to one implementation. Output queue 408 includes an output scheduler 602 and four priority queues 604A, 604B, 604C, and 604D assigned to classes of service 3, 2, 1, and 0, respectively. Forwarding module 402 enqueues the pointers for each frame to a priority queue selected according to the class of service of the frame. For example, the pointers for a frame having class of service 2 are enqueued to priority queue 604B. Each egress module 216 can transmit only one frame at a time. Therefore output scheduler 602 selects one of the priority queues at a time based on a priority scheme that can be predetermined or selected by a user of the switch, such as a network administrator.

One priority scheme is strict priority. According to strict priority, higher-priority frames are always handled before lower-priority frames. Under this scheme, priority queue 604A transmits until it empties. Then priority queue 604B transmits until it empties, and so on.

Another priority scheme is weighted fair queuing. According to weighted fair queuing, frames are processed so that over time, higher-priority frames are transmitted more often than lower-priority frames according to a predetermined weighting scheme and sequence. One weighting scheme for four classes of service is "8-4-2-1." Of course, other weighting schemes can be used, as will be apparent to one skilled in the relevant art after reading this description.

According to 8-4-2-1 weighting, in 15 consecutive time units, 8 time units are allocated to class of service 3, 4 time units are allocated to class of service 2, 2 time units are allocated to class of service 1, and 1 time unit is allocated to class of service 0. In one implementation, the sequence shown in Table 1 is used with 8-4-2-1 weighting.

TABLE 1

| Time Unit | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Priority | 3 | 2 | 3 | 1 | 3 | 2 | 3 | 0 | 3 | 2 | 3 | 1 | 3 | 2 | 3 |

Thus when none of the priority queues are empty, the sequence of classes of service selected by output scheduler 602 is 3-2-3-1-3-2-3-0-3-2-3-1-3-2-3. When one of the priority queues is empty, its slots in the sequence are skipped. For example, if only priority queue 604A is empty, the sequence of classes of service selected by output scheduler 602 is 2-1-2-0-2-1-2.

Figure 7A:
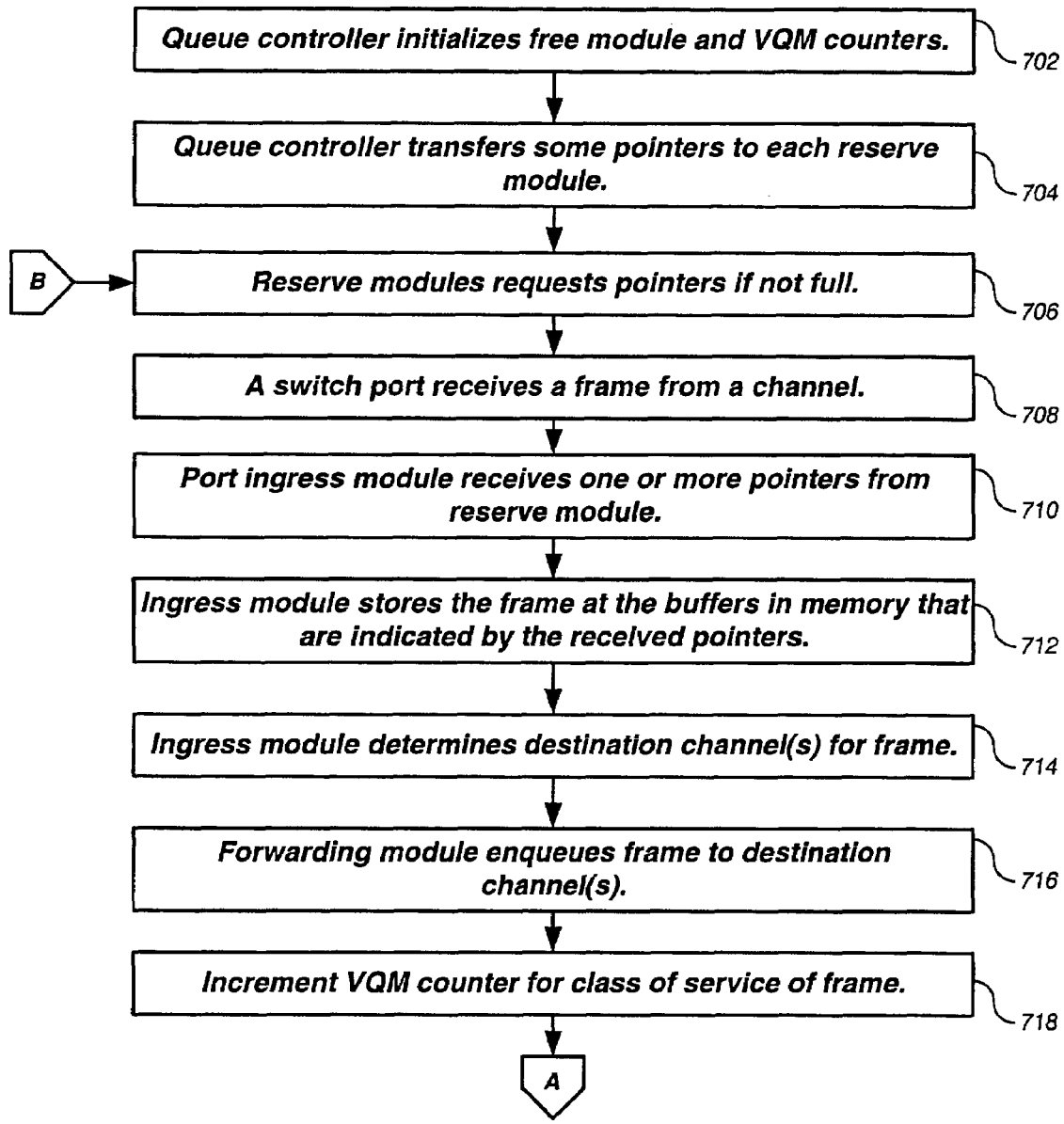
FIGS. 7A and 7B show a flowchart of a process of a network switch such as the switch of FIG. 2 under control of the queue controller of FIG. 4 according to one implementation.
Figure 7B:
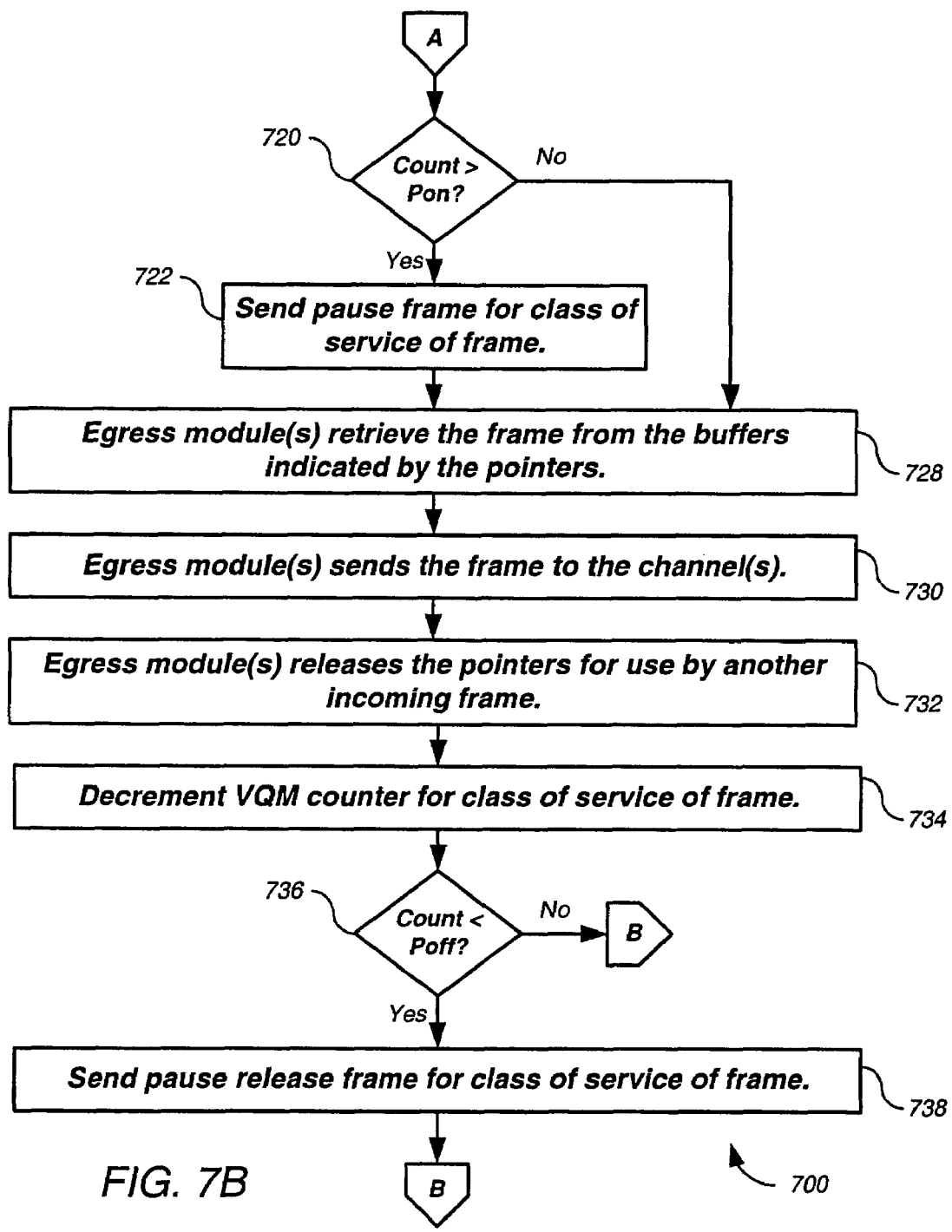

FIGS. 7A and 7B show a flowchart of a process 700 of a network switch such as switch 200 under control of queue controller 400 according to one implementation. At power-on of switch 200, queue controller 400 initializes a free module 404 to contain a number of pointers to unused buffers in memory 208, and initializes the counters in virtual queue modules 416 to zero (step 702). Queue controller 400 transfers some of these pointers to each reserve module 406 (step 704).

Each reserve module 406 includes a counter to count the number of pointers in the reserve module. When the number of pointers is below the capacity of the reserve module 406, the reserve module continually requests pointers from free module 404 (step 706). In some implementations, the capacity of each reserve module 406 is 4 pointers, where a frame of maximum size requires 3 pointers.

A port 202 of switch 200 receives a frame from a channel 204 (step 708). The frame enters the port 202 connected to the channel 204 and traverses the PHY 210 and MAC 212 of the port 202 to reach the ingress module 214 of the port 202. Ingress module 214 receives one or more pointers from the reserve module 406 for the port 202 (step 710). A frame data memory controller within ingress module 214 stores the frame in memory 208 at the buffers that are indicated by the received pointers (step 712). Ingress module 214 then determines the destination channel (or channels in the case of a multicast operation) to which the frame should be sent, according to methods well-known in the relevant arts (step 714).

Forwarding module 402 then enqueues the buffers for the frame to the destination channels of the frame (step 716). Forwarding module 402 enqueues the buffers by sending the pointers for the buffers to the output queues 408 for the ports connected to the destination channels.

The counter for the class of service of the frame in the virtual queue module 416 associated with the ingress module 214 storing the frame in the buffers increments once for each buffer enqueued for data received by that ingress module, preferably after each buffer is enqueued in order to maintain an accurate count. In some embodiments, the counter increments when the corresponding reserve module sends a pointer to forwarding module 402. In other embodiments, the counter increments only after forwarding module 402 has sent the pointer to all of its destination output queues 408.

When the count of any counter exceeds a "pause" threshold Pon (step 718), the corresponding egress module 216 exercises flow control on the corresponding channel for the class of service of the counter (step 720). Of course, each class of service can have a different pause threshold Pon.

In some embodiments, the pause threshold for each counter is offset by the number of buffers reserved by the corresponding reserve module 406 such that the corresponding egress module 216 exercises flow control on a channel for a class of service when the count of the corresponding counter exceeds the pause threshold less the number of buffers reserved by the corresponding reserve module 406.

In some embodiments, a dynamic pause threshold is used, for example based on the number of pointers in free module 404. For example, the dynamic pause threshold Pondyn could be determined by $$Pondyn = Kon \times FreeSize \pm Offset \quad (1)$$

where Kon and Offset are constants and FreeSize is the number of pointers in free module 404.

In an implementation where a port 202 is connected to a full-duplex channel, the port 202 exercise flow control on the channel by sending a "pause" frame to the channel, and release flow control by sending a "pause release" frame to the channel. The pause and pause release frames both comprise a bit vector having a bit for each class of service. When a bit is set in the bit vector in a pause frame, it indicates traffic for the corresponding class of service should be paused. Similarly, when a bit is clear in the bit vector in a pause release frame, it indicates traffic for the corresponding class of service can resume. This use of a bit vector allows a single pause or pause release frame to exercise or terminate flow control for multiple classes of service.

When the pointers for the frame reach the head of an output queue 408 of a port 202, the egress module 216 of the port retrieves the frame from the buffers indicated by the pointers (step 728) and sends the frame to its channel 204 (step 730). The output queue 408 then releases the pointers by returning them to free module 404 (step 732).

The counter for the class of service of the frame in the virtual queue module 416 associated with the ingress module 214 that originally received the frame just transmitted decrements once for each buffer of data transmitted for the frame (step 734), preferably as each buffer is freed in order to maintain an accurate count. When the count of any counter falls below a "pause release" threshold Poff (step 736), the corresponding egress module 216 terminates flow control on the corresponding channel for the class of service of the counter (step 738). Of course, each class of service can have a different pause release threshold Poff.

In some embodiments, the pause release threshold for each counter is offset by the number of buffers reserved by the corresponding reserve module 406 such that the corresponding egress module 216 terminates flow control on a channel for a class of service when the count of the corresponding counter falls below the pause release threshold less the number of buffers reserved by the corresponding reserve module 406.

In some embodiments, a dynamic pause threshold is used, for example based on the number of pointers in free module 404. For example, the dynamic pause threshold Poffdyn could be determined by $$Poffdyn = Koff \times FreeSize \pm Offset \quad (2)$$

where Koff and Offset are constants and FreeSize is the number of pointers in free module 404. Process 700 then resumes at step 706.

Any combination of static and dynamic thresholds, whether offset by the number of buffers reserved by the reserve module or not, can be used for exercising or terminating flow control on a channel.

Each counter is decremented in the following manner. When a reserve module 406 forwards a pointer to an output queue 408, it writes the class of service of the corresponding frame, a source port identifier (SPID) and a destination port vector (DPV) to a header field of the pointer. The DPV is preferably an n-bit vector having a bit for each port 202 of switch 102. Each bit set to one in the DPV indicates a corresponding port 202 as a destination for the data stored in the buffer identified by the pointer.

As described above, each output queue releases a pointer after transmitting the data in the buffer identified by the pointer. When a pointer is released by an output queue 408, multicast module 414 sets the bit for that output queue in the DPV for the released pointer to zero. When a DPV becomes all-zero, indicating that the corresponding data has been transmitted to all of its destination channels, multicast module 414 causes the counter for the class of service identified in the pointer header in the virtual queue module 416 in the port 202 identified by the SPID for the pointer to decrement.

By maintaining virtual input queues (in the form of the counters in virtual input queue modules 416), embodiments of the present invention achieve the accurate and rapid flow control of an input-queued switch in a high-performance output-queued switch while preserving quality of service.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A network switching device comprising:
an ingress module configured to receive frames of data from a first channel, and store the frames of data in one or more buffers, wherein each frame of data has one of a plurality of classes of service;
one or more queues;
a forwarding module configured to enqueue each of the one or more buffers by sending a pointer for each of the one or more buffers to one or more queues after the ingress module stores the frames of data in one or more of the one or more buffers; and
a plurality of counters comprising one counter for each of the classes of service, wherein each of the counters is configured to
store a count for the first channel for a respective one of the classes of service,
increment the count when the forwarding module enqueues one of the buffers storing one of the frames of data having the respective class of service, and
decrement the count after the frame of data stored in a buffer for a frame received from the first channel and having the respective class of service is transmitted from the network switching device; and
an egress module configured to retrieve the frames of data from the one or more buffers, transmit the retrieved frames of data to a second channel, and exercise flow control on the first channel for each of the classes of service when the count for the class of service exceeds a dynamic pause threshold for the class of service, the dynamic pause threshold defined by $$Pondyn = Kon \times FreeSize \pm Offset,$$

wherein Pondyn is the dynamic pause threshold, Kon and Offset are constants and Freesize is a number of pointers available for the received frames of data.

2. The network switching device of claim 1:
wherein, to exercise flow control for one of the classes of service, the egress module is further configured to send a pause frame to the first channel, and wherein the pause frame indicates the one of the classes of service to be paused.

3. The network switching device of claim 1:
wherein the egress module is further configured to terminate flow control on the first channel for the classes of service when the count for the class of service falls below the dynamic pause threshold for the class of service.

4. The network switching device of claim 3:
wherein, to terminate flow control for one of the classes of service, the egress module is further configured to send a pause release frame to the first channel, and wherein the pause release frame indicates the one of the classes of service to be released.

5. The network switching device of claim 3, further comprising a reserve module configured to reserve one or more buffers to the first channel.

6. An integrated circuit comprising the network switching device of claim 1.

7. A network switch comprising the network switching device of claim 1.

8. An output-queued network switch comprising the network switching device of claim 1.

9. The network switching device of claim 1, further comprising:
a memory comprising the buffers.

10. An integrated circuit comprising the network switching device of claim 9.

11. The network switching device of claim 1, further comprising a reserve module configured to reserve one or more buffers to the first channel.

12. A network switching device comprising:
ingress module means for receiving frames of data from a first channel, wherein each frame of data has one of a plurality of classes of service, and storing the data in one or more buffers;
one or more queue means for queuing the one or more buffers;
forwarding module means for enqueuing each of the one or more buffers by sending a pointer for each of the one or more buffers to one or more of the one or more queue means after the ingress module means stores one of the frames of data in the one or more buffers;
a plurality of counter means comprising one counter means for each of the classes of service, each of the counter means for:
storing a count for the first channel for a respective one of the classes of service,
incrementing the count when the forwarding module enqueues one of the buffers storing one of the frames of data having the respective class of service, and
decrementing the count after the frame of data stored in a buffer, from the first channel and having the respective class of service is transmitted from the network switching device; and
egress module means for retrieving the frames of data from the one or more buffers, outputting the frames of data to a second channel and exercising flow control on the first channel for each of the classes of service when the count for the class of service exceeds a dynamic pause threshold for the class of service, the dynamic pause threshold defined by $$Pondyn = Kon \times FreeSize \pm Offset,$$

wherein Pondyn is the dynamic pause threshold, Kon and Offset are constants and Freesize is a number of pointers available for the received frames of data.

13. The network switching device of claim 12:
wherein, to exercise flow control for one of the classes of service, the egress module means sends a pause frame to the first channel; and wherein the pause frame indicates the one of the classes of service to be paused.

14. The network switching device of claim 12:
wherein the egress module means terminates flow control on the first channel for each of the classes of service when the count for the class of service falls below the dynamic pause threshold for the class of service.

15. The network switching device of claim 14:
wherein, to terminate flow control for one of the classes of service, the egress module means sends a pause release frame to the first channel, and wherein the pause release frame indicates the one of the classes of service to be released.

16. The network switching device of claim 14, further comprising reserve module means for reserving one or more buffers to the first channel.

17. An integrated circuit comprising the network switching device of claim 12.

18. A network switch comprising the network switching device of claim 12.

19. An output-queued network switch comprising the network switching device of claim 12.

20. The network switching device of claim 12, further comprising reserve module means for reserving one or more buffers to the first channel.

21. A method comprising:
receiving frames of data from a first channel via an ingress module, wherein each frame of data has one of a plurality of classes of service;
storing the frames of data in one or more buffers;
enqueueing each of the one or more buffers by sending a pointer for each of the one or more buffers to one or more output queues after storing one of the frames of data in the buffer;
storing a count for the first channel for each of the classes of service;
incrementing the count for one of the classes of service enqueueing one of the buffers storing one of the frames of data received from the first channel and having the one of the classes of service;
decrementing the count for one of the classes of service after the frame of data stored in a buffer, received from the first channel and having the one of the classes of service is transmitted;
exercising flow control on the first channel for each of the classes of service using an egress module when the count for one of the classes of service exceeds a dynamic pause threshold for the class of service;
retrieving the frames of data from the one or more buffers; and
transmitting the retrieved frames of data to a second channel via the egress module,
wherein the dynamic pause threshold is defined by $$Pondyn = Kon \times FreeSize \pm Offset,$$

wherein Pondyn is the dynamic pause threshold, Kon and Offset are constants and Freesize is a number of pointers available for the received frames of data.

22. The method of claim 21, wherein exercising flow control for one of the classes of service comprises:
sending a pause frame to the first channel, wherein the pause frame indicates the one of the classes of service to be paused.

23. The method of claim 21, further comprising:
terminating flow control on the first channel for each of the classes of service when the count for the one of the classes falls below the dynamic pause threshold for the class of service.

24. The method of claim 23, wherein terminating flow control for one of the classes of service comprises:
sending a pause release frame to the first channel, and wherein the pause release frame indicates the one of the classes of service to be released.

25. A computer readable medium having a stored computer program embodying instructions executable by a computer, which, when executed by the computer, cause the computer to control an apparatus having an ingress module connected to a first channel and an egress module connected to a second channel, the instructions comprising:
instructions for receiving frames of data from the first channel via the ingress module, wherein each frame of data has one of a plurality of classes of service;
instructions for storing the frames of data in one or more buffers;
instructions for enqueueing each of the one or more buffers by sending a pointer for each of the one or more buffers to one or more output queues after storing the data for one of the frames in the buffer;

instructions for storing a count for the first channel for each of the classes of service;

instructions for incrementing the count for one of the classes of service when enqueueing one of the buffers storing the data for one of the frames received from the first channel and having one of the classes of service, and instructions for decrementing the count for one of the classes of service after the data stored in a buffer for a frame received from the first channel and having the one of the classes of service is transmitted;

instructions for causing the egress module to exercise flow control on the first channel for each of the classes of service when the count for the class of service exceeds a dynamic pause threshold for the class of service;

instructions for retrieving the frames of data from the one or more buffers; and instructions for transmitting the retrieved frames of data via the egress module to the second channel, wherein the dynamic pause threshold is defined by $$Pondyn = Kon \times FreeSize \pm Offset,$$

wherein Pondyn is the dynamic pause threshold, Kon and Offset are constants and Freesize is a number of pointers available for the received frames of data.

26. The computer readable medium of claim 25, wherein the instructions for causing the egress module to exercise flow control for one of the classes of service comprises:

instructions for causing the egress module to send a pause frame to the first channel, wherein the pause frame indicates the one of the classes of service to be paused.

27. The computer readable medium of claim 25, the instructions further comprising:

instructions for causing the egress module to terminate flow control on the first channel for each of the classes of service when the count for each class of service falls below the dynamic pause threshold for the class of service.

28. The computer readable medium of claim 27, wherein the instructions for causing the egress module to terminate flow control for one of the classes of service comprises:

instructions for causing the egress module to send a pause release frame to the first channel, wherein the pause release frame indicates the one of the classes of service to be released.

29. A network switching device comprising:

a plurality of counters for a plurality of classes of service, respectively, each counter configured to:

store a count for a respective one of the classes of service;

increment the count when one of buffers storing one or more frames of data having the respective class of service is enqueued by sending a pointer for each of the one or more buffers to one or more output queues; and decrement the count after the one or more frames of data stored in the one or more buffers is transmitted from the network switching device;

an egress module configured to retrieve the one or more frames of data from the buffers and output the retrieved one or more frames to a destination channel, the egress module further configured to generate a pause frame indicating one or more of the classes of service to be paused when one or more counts for the one or more classes of service exceed a dynamic pause threshold for the one or more classes of service; and an ingress module configured to receive the one or more frames from a source channel and store the one or more frames to the buffers wherein the dynamic pause threshold is defined by $$Pondyn = Kon \times FreeSize \pm Offset,$$

wherein Pondyn is the dynamic pause threshold, Kon and Offset are constants and Freesize is a number of pointers available for the ingress module.

30. The network switching device of claim 29, wherein the egress module is further configured to generate a pause release frame indicating one or more of the classes of service to be released when one or more counts for the respective classes of service fall below the dynamic pause threshold for the respective classes of service.

31. An integrated circuit comprising the network switching device of claim 29.

32. A network switch comprising the network switching device of claim 29.

33. An output-queued network switch comprising the network switching device of claim 29.

34. The network switching device of claim 29, further comprising a memory including the buffers.

35. An integrated circuit comprising the network switching device of claim 34.

36. A network switching device comprising:

means for receiving one or more frames of data from a source channel;

means for storing a plurality of counts for a plurality of classes of service, respectively;

means for incrementing each count upon enqueuing one or more buffers storing the one or more frames of data by sending a pointer for each of the one or more buffers to one or more output queues, each of the frames of data having one of the classes of service; and means for decrementing each count after the one or more frames of data stored in the one or more buffers are transmitted from the network switching device; and means for outputting the one or more frames of data stored in the one or more buffers to a destination channel, wherein the means for outputting generates a pause frame indicating one or more classes of services to be paused when the one or more counts for the respective classes of service exceed a dynamic Pause threshold for the respective classes of service, wherein the dynamic pause threshold is defined by $$Pondyn = Kon \times FreeSize \pm Offset,$$

wherein Pondyn is the dynamic pause threshold, Kon and Offset are constants and Freesize is a number of pointers available for the received frames of data.

37. The network switching device of claim 36, wherein the means for outputting generates a pause release frame indicating one or more of the classes of service to be released when one or more counts for the respective classes of service fall below the dynamic pause threshold for the respective classes of service.

38. An integrated circuit comprising the network switching device of claim 36.

39. A network switch comprising the network switching device of claim 36.

40. An output-queued network switch comprising the network switching device of claim 36.

41. A method comprising:

receiving one or more frames of data from a source channel via an ingress module;

storing a plurality of counts for a plurality of classes of service, respectively;

incrementing each count upon enqueuing one or more buffers storing the one or more frames of data by sending a pointer for each of the one or more buffers to one or more output queues, each frame of data having one of the classes of service;

decrementing each count after the one or more frames of data stored in the one or more buffers and having the one of the classes of service are transmitted from the network switching device;

causing an egress module to generate a pause frame indicating that one or more of the classes of service to be paused when one or more counts for the respective classes of service exceed a dynamic pause threshold for the respective classes of service;

sending the pause frame to a source channel ingress module;

retrieving the one or more frames of data stored in the one or more buffers; and outputting the retrieved one or more frames to a destination channel via the egress module, wherein the dynamic pause threshold is defined by $$Pondyn = Kon \times FreeSize \pm Offset,$$

wherein Pondyn is the dynamic pause threshold, Kon and Offset are constants and Freesize is a number of pointers available for the received frames of data.

42. The method of claim 41, further comprising:

causing the egress module to generate a pause release frame indicating one or more of the classes of service to be released when one or more counts for the respective classes of service fall below the dynamic pause threshold for the respective classes of service.

43. A computer readable medium having a stored computer program embodying instructions, which, when executed by a computer, cause the computer to control an apparatus having an ingress module connected to a source channel and an egress module connected to a destination channel, the instructions comprising:

instructions for receiving one or more frames of data from a source channel via an ingress module;

instructions for storing a plurality of counts for the source channel for a plurality of classes of service, respectively;

instructions for incrementing each count upon enqueuing one or more buffers storing the one or more frames of data having the respective class of service by sending a pointer for each of the one or more buffers to one or more output queues;

instructions for decrementing each count after the one or more frames of data stored in the one or more buffers and having the respective class of service is transmitted from the network switching device; and instructions for causing the egress module to generate a pause frame indicating that one or more classes of services to be paused when one or more counts for the respective classes of service exceed a dynamic pause threshold for the respective classes of service, wherein the dynamic pause threshold is defined by $$Pondyn = Kon \times FreeSize \pm Offset,$$

wherein Pondyn is the dynamic pause threshold, Kon and Offset are constants and Freesize is a number of pointers available for the received frames of data.

44. The computer readable medium of claim 43, the instructions further comprising: instructions for causing the egress module to generate a pause release frame indicating that one or more of the classes of service to be released when one or more counts for the respective classes of service fall below the dynamic pause threshold for the respective classes of service.

* * * * *